May 16, 1967 H. J. HERSHEY ETAL 3,320,369

AUTOMATIC CODE TRANSMITTER UTILIZING A CODE BEARING MEDIUM HAVING BITS OF INFORMATION

Filed March 20, 1964 8 Sheets-Sheet 1

INVENTORS: H. J. HERSHEY
R. J. O'CONNOR
M. L. WARNOCK

BY Harry L. Newman

ATTORNEY

United States Patent Office 3,320,369
Patented May 16, 1967

3,320,369

AUTOMATIC CODE TRANSMITTER UTILIZING A CODE BEARING MEDIUM HAVING BITS OF INFORMATION

Harold J. Hershey, Robert J. O'Connor, and Merville L. Warnock, Indianapolis, Ind., assignors to Bell Telephone Laboratories, Incorporated, New York, N.Y., a corporation of New York Filed Mar. 20, 1964, Ser. No. 353,356
8 Claims. (Cl. 179—90)

This invention relates to code transmitters and particularly to automatic code transmitters operated in conjunction with a code bearing medium having a plurality of bits of information encoded therein.

Automatic code transmitters of this type may be employed to transmit signals representing the digits of a telephone number, and recently several such code transmitters have become available to telephone subscribers. One such code transmitter that has received wide acceptance by the subscribers is disclosed in the application of E. R. Andregg – W. Pferd – R. R. Stokes, Ser. No. 193,267, now Patent No. 3,189,692 filed May 8, 1962 and assigned to the assignee of this invention. This automatic code transmiter provides accurate and trouble free service at a comparatively economical cost to the subscriber.

This code transmitter does, however, have some deficiencies. It offers some problems in manufacturing inasmuch as it is necessary to make individual adjustments on each code transmitter during the assembly thereof. In addition, the code transmitter is polarity sensitive, and the pulse characteristics of the code transmitter are affected by the age of the transmitter, the loop characteristics of the telephone set with which the transmitter is associated, and the conditions at the location at which the telephone set is installed. The code transmitter is also somewhat noisy, both mechanically and electrically, in operation.

An object of this invention is to provide an automatic code transmitter that does not suffer from the aforementioned deficiencies.

This and other objects of this invention are achieved in an illustrative embodiment thereof wherein the code transmitter operates in conjunction with a card having each digit of the telephone number of the subscriber to be called encoded thereon. The code transmitter includes a plurality of normally open switches, particular ones of which are closed responsive to each encoded digit, and means for periodically advancing the card to sequentially present the individual encoded digits to the code actuated switches. The code transmitter further includes a programmed member and a synchronous motor that act through a normally engaged clutch to rotate the programmed member past a plurality of brushes. The rotation of the programmed member winds up a coil spring associated therewith and whenever the clutch is disengaged the coil spring counter-rotates the programmed member to a rest position.

The programmed member has a particular pattern of conductive and nonconductive areas thereon, and one of the brushes interacts therewith to provide a normally closed pulsing switch that is periodically opened and closed as the programmed member rotates. Other of the brushes interact with the pattern on the programmed member to provide a plurality of normally open switches that are closed and opened in a particular sequence as the member rotates. The pulsing switch is connected in series with the direct current path of the circuit of an associated telephone set, and when the telephone set is connected across a telephone line each opening of the pulsing switch interrupts the telephone line and transmits a pulse thereover. The plurality of sequentially actuated switches are interconnected with the plurality of code actuated switches to form a switching matrix that is connected in series with a relay in a circuit separate from the telephone circuit.

In the operation of the code transmitter, the encoded card is positioned to present the first encoded digit to the code actuated switches, and the handset of the associated telephone set is lifted to connect the telephone set across a telephone line. A start button is then operated to connect the synchronous motor across a power source. The motor commences to rotate the programmed member from its rest position, and after the programmed member has rotated through a particular angular distance, it connects the switching matrix circuit across the power source and commences to close and open the sequentially actuated switches.

When the closed sequentially actuated switches correspond to the closed code actuated switches, a path is provided through the switching matrix circuit and the relay is energized. The energized relay disengages the clutch to permit the motor spring to counter-rotate the programmed member to its rest position. In addition, the energized relay places a short across the pulsing switch and thereby prevents the interruption of the telephone line during the counter-rotation of the programmed member. Finally, the energized relay operates the advancing means to present the next encoded digit to the code actuated switches. The clutch is thereafter engaged and the motor again commences to rotate the programmed member from its rest position.

A complete understanding of the invention and of these and other features and advantages thereof may be gained from consideration of the following detailed description taken in conjunction with the accompanying drawing wherein one embodiment of the invention is illustrated. It is to be expressly understood, however, that the drawing is for the purpose of illustration and description and is not to be construed as defining the limits of the invention.

*General description*

Figures 1, 2:
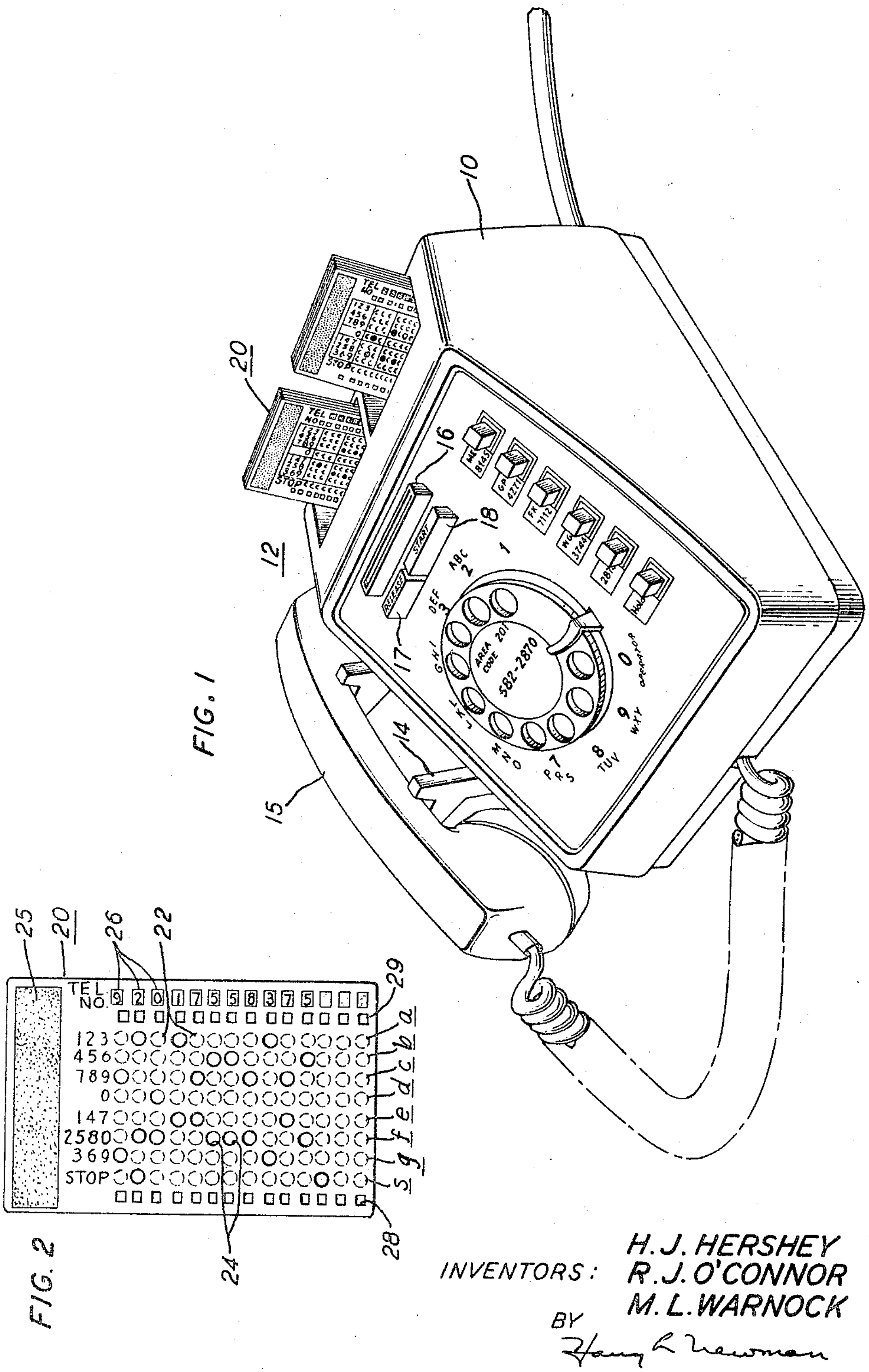
FIG. 1 is a perspective view of a telephone set including the automatic code transmitter of this invention.
FIG. 2 is a plan view of an encoded card that is employed in conjunction with and serves as the memory for the automatic code transmitter.

The code transmitter of the present invention is adapted to supplement the manual dialing facilities of the ordinary telephone set by providing automatic means for dialing frequently called telephone numbers. As shown in FIG. 1, the automatic code transmitter may be incorporated in a deskstand 10 of a telephone set 12, the deskstand including a switchhook 14 on which a handset 15 is normally positioned. An entryway 16, a release button 17, and a start button 18 of the code transmitter protrude through the faceplate of the deskstand 10, while code bearing members in the form of encoded cards 20, which serve as the memory for the code transmitter, are stored in wells in the deskstand.

As illustrated in FIG. 2, each encoded card 20 comprises a rectangular planar member that is formed to include an array of removable discs arranged in eight longitudinal columns and fourteen transverse rows. Each row of discs 22 is encodable to represent a single digit of a telephone number and is so encoded by removing selected ones of the discs to form one or two code holes 24 in the row, the discs being removed by pressing thereon with a pencil or similar instrument. For purposes of reference, the columns of discs 22 are identified in the drawing by the letters *a*, *b*, *c*, *d*, *e*, *f*, *g*, and *s* reading from right to left, and the particular columns in which code holes 24 are formed to represent the digits one through zero as follows:

| Digit: | Columns in which code holes are formed |
|---|---|
| 1 | *ae* |
| 2 | *af* |
| 3 | *ag* |
| 4 | *be* |
| 5 | *bf* |
| 6 | *bg* |
| 7 | *ce* |
| 8 | *cf* |
| 9 | *cg* |
| 0 | *d* or *df* |

To assist in the use of the card 20, an area 25 is provided at the top of each card for recording the name of the subscriber whose telephone number is to be encoded on the card, and a plurality of areas 26 are provided along one side of each card for recording the individual digits of the subscriber's telephone number, each digit area being in line with one of the rows of discs 22. Furthermore, groups of digits are printed above each of the columns *a* through *g* to indicate in which columns code holes 24 are to be formed to represent each of the digits.

With regard to the discs 22 in the column marked "stop," that is, the *s* column, one of these discs is removed from a particular row when it is desirable to stop the operation of the code transmitter subsequent to the dialing of the digit represented by the previous row. For example, when the code transmitter is used in an office served by a private branch exchange, it is necessary to dial an initial digit to gain access to an outside trunk line and thereafter observe whether the trunk line is clear before the telephone number of the party to be called can be dialed. In such a situation, the disc 22 in the second row of the *s* column is removed.

Another example of when it is desirable to stop the operation of the call transmitter is where a telephone number encoded on the card 20 is less than fourteen digits. The card 20 is provided with fourteen rows of removable discs 22 and is therefore capable of having a fourteen digit telephone number encoded thereon, a fourteen digit telephone number being the largest telephone number presently contemplated for use in the telephone system. Where the telephone number encoded on the card 20 is less than fourteen digits, a disc 22 is removed from the *s* column in the row following the last digit of the telephone number.

Extending longitudinally along the length of the card 20 on either side of the array of discs 22 is a pair of columns of sprocket holes 28 and 29, the purpose of which is hereinafter explained.

*Mechanical description*

In the mechanical description that follows, the components of the automatic code transmitter will be disclosed in the following order: frame; means for initiating and terminating the operation of the code transmitter; means for scanning the memory of the code transmitter; means for translating the information stored in the memory; and means under the control of the translating means for generating signals.

*Frame*

Figure 3:
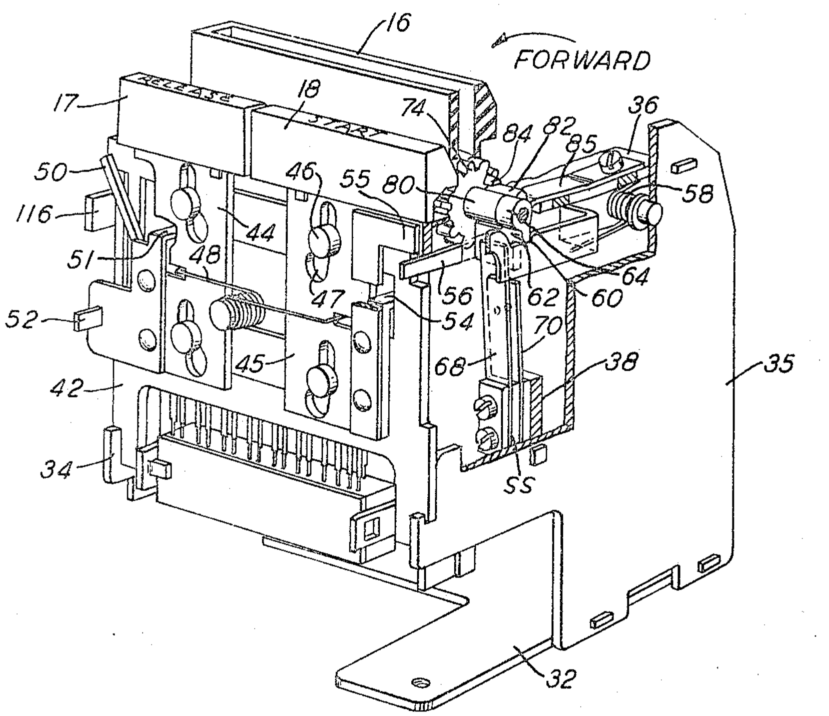
FIG. 3 is a front perspective view of the automatic code transmitter separated from the telephone set, portions being broken away to show elements of the means for initiating and terminating the operation of the code transmitter.
Figure 4:
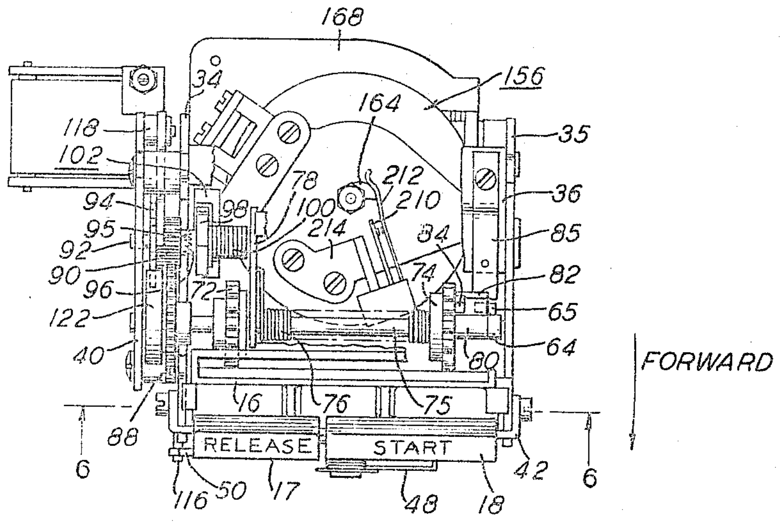
FIG. 4 is a top view of the code transmitter with parts broken away to show elements of the means for scanning the encoded card.
Figure 11:
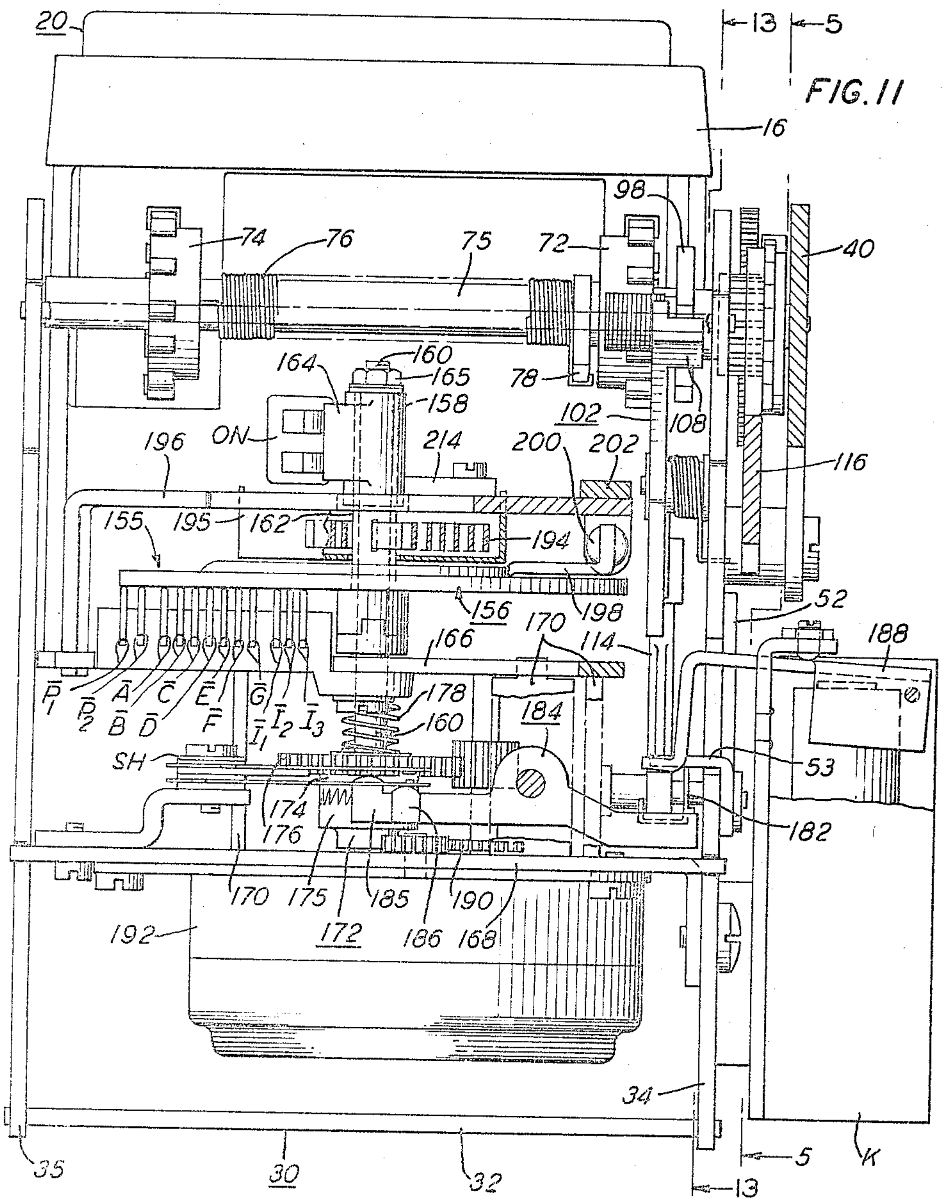
FIG. 11 is a rear view of the code transmitter showing the relationship between elements of the translating means when the relay thereof is unactuated.

A frame 30, seen best in FIGS. 4 and 11, serves as the foundation for the automatic code transmitter. The frame 30 includes a bottom plate 32, side plates 34 and 35, and a top plate 36 joined together to form a box. The frame 30 further includes a middle plate 38 (FIG. 3) extending between and joined to the side plates 34 and 35 and an auxiliary side plate 40 secured to and spaced from the side plate 34. The frame 30 is made rigid and accurate by using index surfaces that are held to close tolerances and slots and tabs that are staked together while the frame is held in place by a fixture.

*Operation initiating and terminating means*

Referring to FIG. 3, the means for initiating and terminating the operation of the automatic code transmitter includes an upright support plate 42 that is secured to the side plates 34 and 35 of the frame 30. Release plunger 44 and a start plunger 45 are slidably mounted on the support plate 42 by means of nail head pins 46, and slots 47 in the plnngers cooperate with the pins to limit the movement of the plungers to a vertical path along the face of the plate. The release button 17 and the start button 18 are respectively mounted on the release and start plungers 44 and 45, and when the buttons are depressed, the plungers with which they are associated are displaced to a downward position, and when the buttons are released, the plungers are returned to an upward position by a torsion spring 48.

Figure 5:
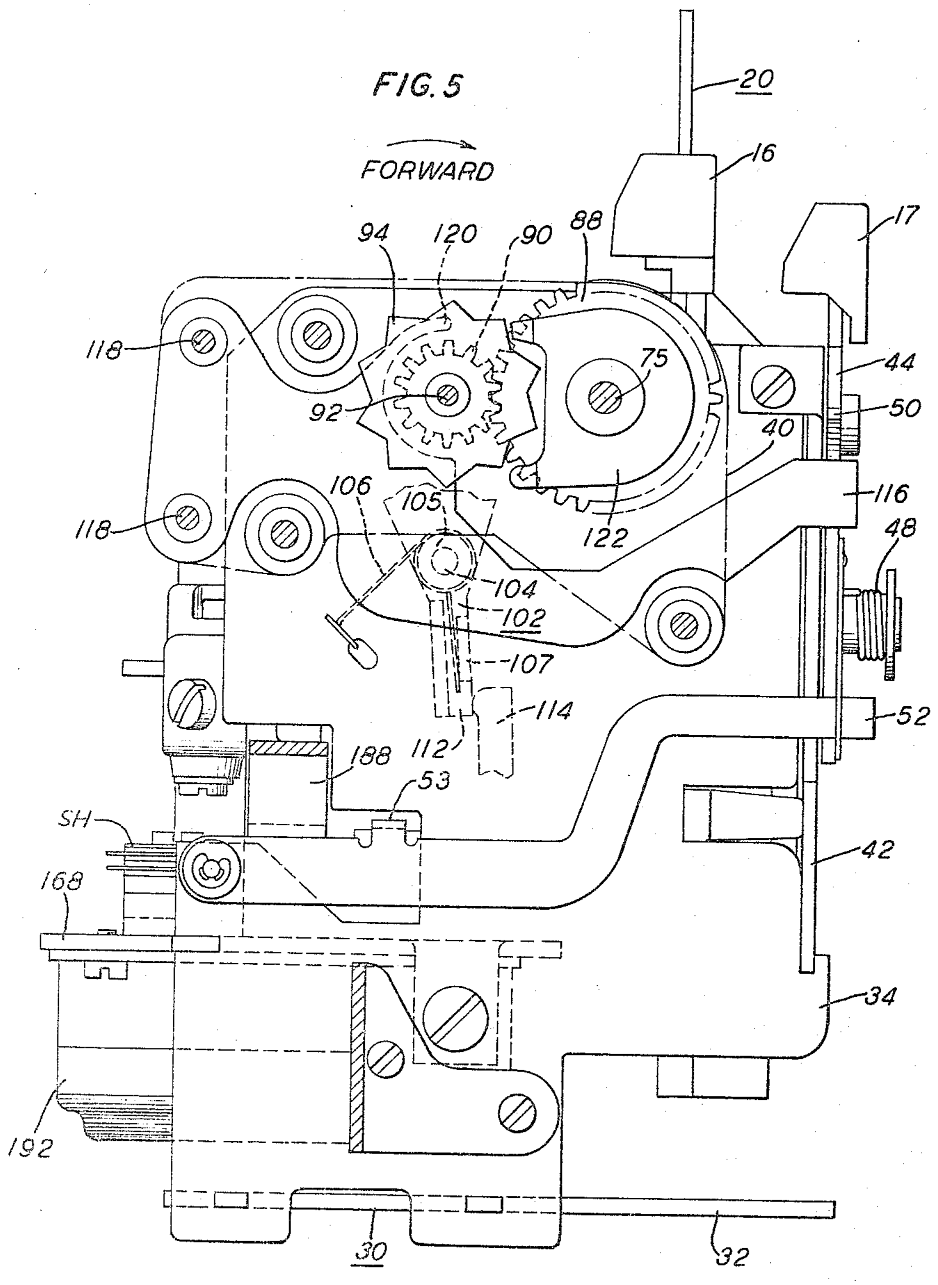
FIG. 5 is a sectional view of the code transmitter taken along line 5—5 of FIG. 4.

The release plunger 44 includes an obliquely extending arm 50, a rearward extending finger 51, and a slot through which one end of a release lever 52 extends. As shown in FIG. 5, the other end of the release lever 52 is pivotally mounted to the side plate 34 of the frame 30, and intermediate the ends of the lever, it has a laterally extending finger 53. Upon the depression of the release button 17, the arm 50 interacts with the scanning means to effect the release of the encoded card 20, while the fingers 51 and 53 interact with the translating means to effect the termination of the operation of the code transmitter.

The start plunger 45 includes a rearwardly extending finger 54 and a laterally extending arm 55, and upon the depression of the start button 18, the finger 54 interacts with the translating means and the arm 55 interacts with a start latch 56 to initiate the operation of the code transmitter. The start latch 56 has one end thereof pivotally mounted to the side plate 35, and a spring 58 disposed about the pivot biases the latch upwardly, normally maintaining the other end thereof against the arm 55. A notch 60 in the upper surface of the latch 56 is adapted to accommodate a radially extending vane 62 of a rotatively mounted detent 64, the detent also having an arcuate ridge 65 (FIG. 4). The vane 62 serves as the actuator for a normally open start switch SS, the start switch including a movable contact spring 68 and a stationary contact spring 70. The start switch SS is mounted to the middle plate 38 adjacent to the notch 60 in the start latch 56, and when the vane 62 is positioned in the notch, it deflects the movable contact spring 68 away from the stationary contact spring 70. In addition, when the vane 62 is positioned in the notch 60 it is held captive thereby. When, however, the start latch 56 is pivoted downward by the depression of the start button 18 and the detent 64 is not otherwise restrained, the movable contact spring 68 rotates the detent in a forward direction and moves into engagement with the stationary contact spring 70 to close the start switch SS.

*Scanning means*

Referring to FIGS. 3 and 4, the means for scanning the memory of the code transmitter comprises a pair of spaced sprockets 72 and 74 fixedly mounted on a shaft 75 that is journaled in and extends between the side plate 35 and the auxiliary side plate 40. A motor spring 76 is disposed about the shaft 75 in between the sprockets 72 and 74, and one end of the motor spring is hooked into a cavity in the sprocket 74 while the other end of the motor spring is secured to a spring retainer 78 rotatively mounted on the shaft adjacent to the sprocket 72 and biased by the motor spring against the top plate 36. The sprockets 72 and 74 are adapted to respectively engage the columns of sprocket holes 28 and 29 of the card 20 (FIG. 2) upon the insertion of the card into the entryway 16, and the interaction between the sprocket holes and the sprockets as the card is inserted into the entryway results in the sprockets and thereby the shaft 75 being rotated in a forward direction. The forward rotation of the sprockets 72 and 74 winds up the motor spring 76, storing energy therein, and as hereinafter described, this energy is subsequently used to rotate the sprockets in a rearward direction to move the card 20 out of the entryway 16.

An intermediate link 80 is rotatively mounted on the shaft 75 between the sprocket 74 and the detent 64, the link including a radially extending flange 82. The flange 82 extends into the path of a tab 84 that protrudes from the adjacent side of the sprocket 74, and a stop 85 secured to the top plate 36 extends into the path of the flange. In addition, the arcuate ridge 65 on the detent 64 extends into the path of the flange 82 but extends short of the stop 85.

As illustrated in FIG. 3, prior to the insertion of the card 20 into the entryway 16, the tab 84 of the sprocket 74 is biased by the motor spring 76 against the flange 82 of the link 80, which is in turn biased against the stop 85, the stop serving to prevent any further rearward rotation of the link 80 and the sprockets 72 and 74 by the motor spring. In addition, the flange 82 holds the detent 64 in a latched position with the vane 62 positioned in the notch 60 of the start latch 56, the ridge 65 of the detent being biased against the flange by the movable contact spring 68 of the start switch SS. Thus should the start button 18 be depressed prior to the insertion of the card 20 into the entryway 16, the start latch 56 is pivoted downward, but the detent 64 is prevented from rotating, and the start switch SS therefore remains open.

When the card 20 is inserted into the entryway 16, the sprocket 74 and thereby the tab 84 is rotated in a forward direction. As a result, the link 80 is no longer biased against the stop 85, and the detent 64 is no longer restrained by the link. The movable contact spring 68 is therefore free to rotate the detent 64 and closes on the stationary contact spring 70 when the start latch 56 is rotated downward by the depression of the start button 18.

Turning now to FIGS. 4 and 5, fixedly mounted on the end of the shaft 75 opposite the detent 64 is a gear 88 that meshes with a pinion 90. The pinion 90 is rotatively mounted on a shaft 92 and includes a star wheel 94 on one end thereof and a face ratchet 95 on the other end thereof, the face ratchet being adapted to engage a complementary face ratchet 96 on a ratchet wheel 98. Like the pinion 90, the ratchet wheel 98 is rotatively mounted on the shaft 92, but a band clutch 100 disposed about the hub of the ratchet wheel permits only forward rotation thereof. In addition, while the position of the ratchet wheel 98 along the axial length of the shaft 92 is fixed, the pinion 90 is axially displaceable along the shaft. However, a compression spring (not shown) mounted internally to the pinion 90 biases it toward the ratchet wheel 98, thereby tending to maintain the face ratchet 95 in engagement with the face ratchet 96. Finally, the teeth of the face ratchets 95 and 96 have the faces thereof extending substantially parallel to and the backs thereof extending at a high angle to the axis of the shaft 92. Consequently, when the faces of the teeth are rotated away from one another, as when the face ratchet 95 is rotated rearwardly, the ratchets are able to move relative to another. When, on the other hand, the faces of the teeth are moved into engagement with one another, as when the face ratchet 95 is moved forwardly, the face ratchets lock and there can be no relative motion therebetween.

These features combine to provide the following results. As the card 20 is inserted into the entryway 16, the sprockets 72 and 74 and thereby the gear 88 are rotated in a forward direction, and the pinion 90 is rotated in a rearward direction. The ratchet wheel 98 is restrained from moving in a rearward direction by the band clutch 100 and hence the face ratchet 95 slips past the face ratchet 96. When the card 20 is no longer being inserted into the entryway 16, the motor spring 76 acts to rotate the sprockets 72 and 74 rearwardly to move the card out of the entryway. The motor spring 76 thereby acts to rotate the gear 88 rearwardly and the pinion forwardly. As a consequence, the motor spring 76 biases the faces of the teeth of the face ratchet 95 into engagement with the faces of the teeth of the face ratchet 96, and tries to rotate the ratchet wheel 98 in a forward direcion.

Figure 13:
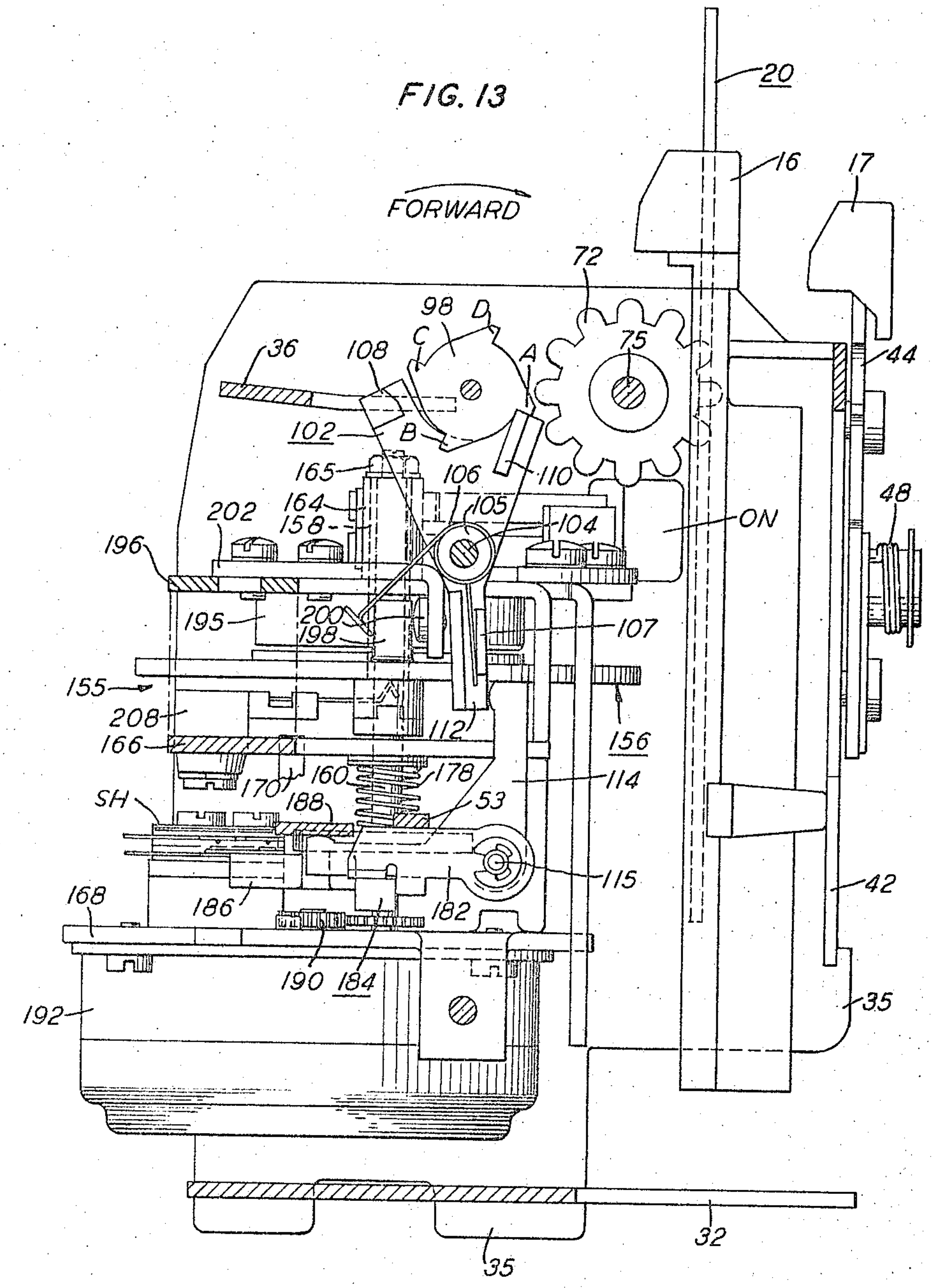
FIG. 13 is a sectional view taken along line 13—13 of FIG. 11.

Referring also to FIG. 13, the forward rotation of the ratchet wheel 98 and thereby the movement of the card 20 out of the entryway 16 by the rearward rotation of the sprockets 72 and 74 is controlled by an escapement pawl 102, the pawl being rotatively mounted on a shaft 104 that projects laterally from the side plate 34. The pawl 102 includes a hub 105 that serves to space the operating elements of the pawl from the side plate 34, and a torsion spring 106, which is disposed about the hub and has one end thereof secured to the side plate and the other end thereof bearing against a downward boss 107 on the pawl, biases the pawl in a rearward direction.

The operating elements of the escapement pawl 102 comprise a rearward boss 108, a forward boss 110, and a follower 112. The torsion spring 106 normally biases the forward boss 110 into engagement with the ratchet wheel 98, and in this position, the forward boss 110 lies in the path of teeth A, B, C, and D on the ratchet wheel 98 and is, for example, in engagement with the tooth A, while the rearward boss 108 lies out of the path of the ratchet wheel teeth. The forward boss 110 thereby blocks the forward rotation of the ratchet wheel 98, and the sprockets 72 and 74 are prevented from rotating in a rearward direction.

Figure 15:
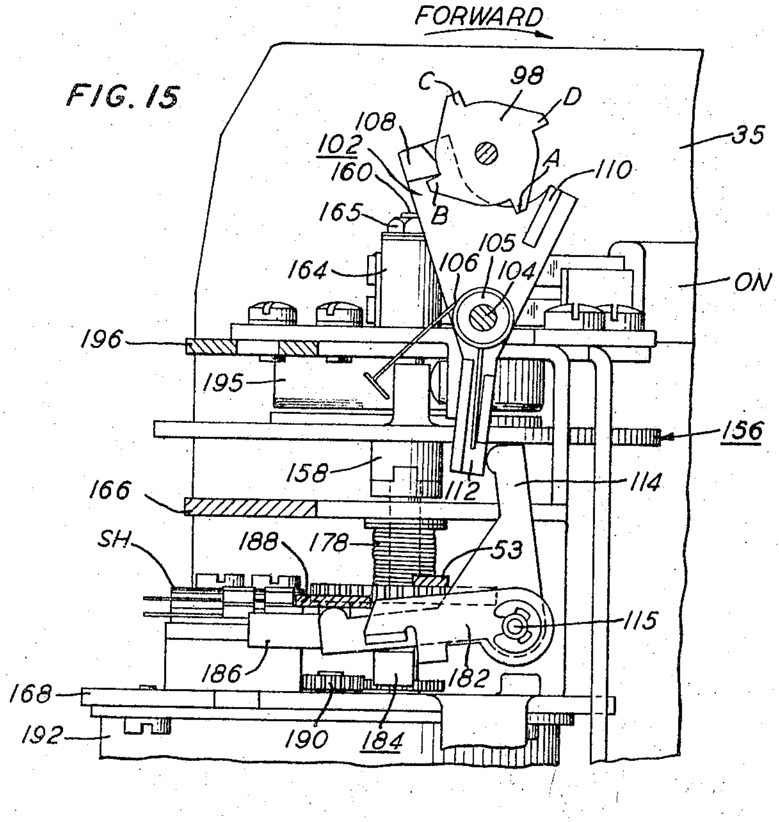

A bell crank 114 rotatively mounted on a shaft 115 has a vertical leg thereof extending into engagement with the follower 112 of the escapement pawl 102, and during the operation of the code transmitter, the bell crank is, in a manner hereinafter described, periodically rotated rearwardly to the position shown in FIG. 15. In moving to this position, the vertical leg of the bell crank 114 forwardly rotates the escapement pawl 102 to a position wherein the forward boss 110 lies outside of the path of the teeth on the ratchet wheel 98, and the rearward boss 108 lies in the path of the teeth. The motor spring 76 acting through the gear 88, the pinion 90, and face ratchets 95 and 96, thereupon rotates the ratchet wheel 98 through forty-five degrees in a forward direction, at which point the rotation of the ratchet wheel is arrested by the engagement of the tooth B thereof with the rearward boss 108.

When the bell crank 114 subsequently returns to its normal position, the spring 106 rotates the escapement pawl 102 to move the rearward boss 108 out of and the forward boss 110 into the path of the teeth on the ratchet wheel 98, and the ratchet wheel, biased in a forward direction by the motor spring 76, rotates through another forty-five degrees whereupon its motion is arrested by the engagement of the tooth D with the forward boss 110. Thus for every actuation of the bell crank 114, the ratchet wheel 98 is permitted to rotate forwardly through an angular distance of ninety degrees, and this forward rotation of the ratchet wheel is translated by the face ratchets 95 and 96, the pinion 90, and the gear 88 into rearward rotation of the sprockets 72 and 74, the sprockets being rotated through an angular distance to move the card 20 (FIG. 2) upward the distance between the rows of removable discs 22.

Turning again to FIGS. 4 and 5, to release the sprockets 72 and 74 from the control of the ratchet wheel 98 and the escapement pawl 102 and thereby permit rapid removal of the card 20 from the entryway 16, a release arm 116 is provided. The back end of the release arm 116 is pivoted on two pins 118 secured to the auxiliary plate 40, the pins permitting the arm to swing in a manner similar to a swinging gate. The center of the arm 116 includes a fork portion 120 that encompasses a portion of the pinion 90 and is contiguous with the star wheel 94. Since the star wheel 94 is biased away from the auxiliary side plate 40 by the compression spring (not shown) internal to the pinion 90, the star wheel normally maintains the forward end of the release arm 116 beneath the obliquely extending arm 50 of the release plunger 44 (FIG. 3). However, when the release button 17 is depressed, the arm 50 on the release plunger 44 deflects the release arm 116 toward the auxiliary plate 40, and the fork portion 120 thereof acting upon the star wheel 94 deflects the pinion 90 away from the ratchet wheel 98. The face ratchet 95 is thereby disengaged from the face ratchet 96, and because the motor spring 76 is no longer restrained by the ratchet wheel 98, the motor spring unwinds rapidly until the motion of the sprockets 72 and 74 is arrested by the engagement of the tab 84 on the sprocket 74 with the flange 82 of the link 80, the motion of the link having been in turn arrested by the stop 85.

To limit the speed at which the sprockets 72 and 74 are rotated by the motor spring 76, the star wheel 94 interacts with a brake 122 rotatively mounted on the shaft 75. The brake 122 includes projections that are so located with respect to the teeth on the star wheel 94 that as the star wheel rotates the brake is automatically kicked up and down by the teeth. Since the brake 122 has inertia, this change in direction of its travel absorbs energy from the pinion gear 90 and thereby retards the rotation of the sprockets 72 and 74.

*Translating means*

Figure 8:
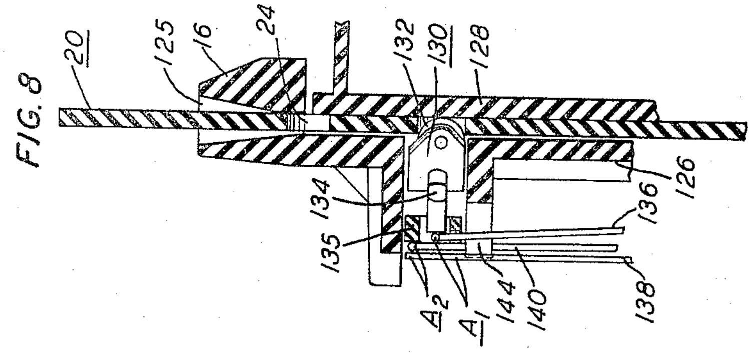
FIGS. 7 and 8 are sectional views taken along line 7 & 8—7 & 8 of FIG. 6 showing the interaction between the encoded card and a code actuated switch.
Figure 7:
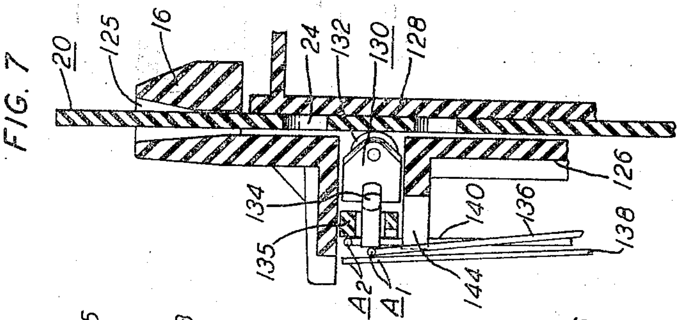
Figure 6:
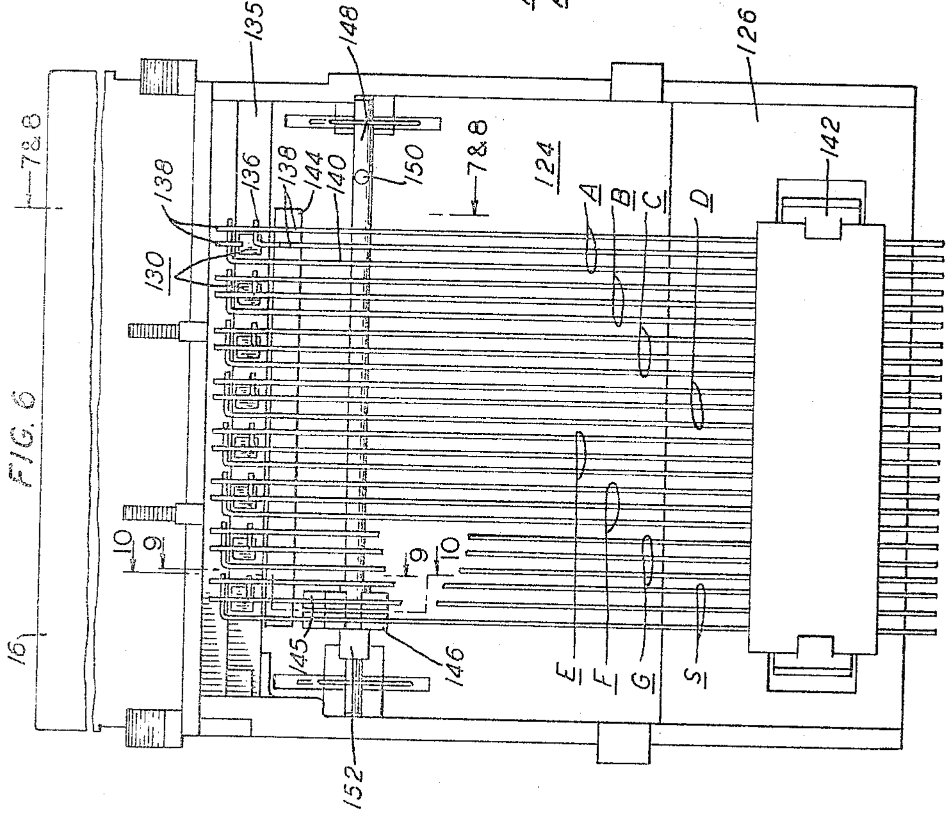
FIG. 6 is a sectional view of the code transmitter taken along line 6—6 of FIG. 4 showing the code actuated switching means of the means for translating the information encoded on the card.

Referring now to FIGS. 6, 7, and 8, the means for translating the information stored in the memory includes a switching means 124 actuated responsive to the holes 24 in the encoded card 20. The switching means 124, which is of the type disclosed in the copending application of M. S. Hawley-H. J. Hershey, Ser. No. 175,718, filed Feb. 26, 1962 and assigned to the assignee of this invention, comprises a passageway 125 defined by the entryway 16, a plate 126 integral with the entryway, and a card guide 128. The plate 126 includes a row of eight spaced apertures, and situated in each aperture is a dielectric sensing member 130. The spacing between the sensing members 130 is the same as the spacing between the columns of removable discs 22 (FIG. 2) in the card 20, and when the card is inserted into the passageway 125, it is so located by the engagement of the sprocket holes 28 and 29 therein with the sprockets 72 and 74 (FIG. 4) that the sensing members are in registration with the columns of removable discs. In addition, the sprockets 72 and 74 under the control of the face ratchet 95 interacting with the face ratchet 96 and the ratchet wheel 98 interacting with the escapement pawl 102 so locate the card 20 that when the card is fully inserted into the passageway 125, the first row of removable discs 22 is in juxtaposition with the row of sensing members 130, and thus as the card is advanced out of the passageway, the remaining rows of removable discs are sequentially placed in juxtaposition with the row of sensing members.

The end of each sensing member 130 that is in juxtaposition with the passageway 125 includes a roller 132 for making rolling contact with the card 20, while the other end of each sensing member includes portions 134 for engaging a datum bar 135 common to all the sensing members. The datum bar 135 merely rests on the engaging portions 134 of the sensing members 130, and thus the sensing members are individually movable relative to the datum bar.

A switch comprising a grouping of three wire spring contacts is associated with each sensing member 130. The individual switches are identified as A, B, C, D, E, F, G, and S, and the sensing members 130 with which they are associated respectively extend the juxtaposition with the columns of discs a, b, c, d, e, f, g and s (FIG. 2) when the card 20 is positioned within the passageway 125. The contacts within each grouping comprise a break contact 136, a bifurcated transfer contact 138, and a make contact 140. The break contact 136 rests on the end of the sensing member 130 and biases it toward the passageway 125. The make contact 140 rests on the datum bar 135 and biases it toward the engaging portions 134 of the sensing member 130. The transfer contact 138 extends into juxaposition with both the break and make contacts 136 and 140 and is biased toward the passageway 125.

The lower ends of the contacts, which are secured in a spaced array and insulated from one another, are mounted to the plate 126 by a clamp 142. The upper unsecured ends of the contact members are maintained in the proper transverse spatial relationship by a comb 144, the teeth of which serve to limit the movement of the contacts to a direction perpendicular to the sensing members 130.

When an encoded card 20 is inserted into the passageway 125, each sensing member 130 under the bias of the contacts associated therewith assumes one of two positions: (1) It is resting on the surface of the card, the removable disc 22 having not been removed; or (2) it is resting in a hole 24 in the card, the removable disc having been removed. Because of the manner in which the card 20 is coded, there is always a majority of sensing members 130 resting on the surface of the card and these sensing members maintain the datum bar 135 a constant distance from the surface of the card, the datum bar in turn maintaining the make contacts 140 a constant distance from the surface of the card. The break contacts 136, on the other hand, move with the sensing members 130.

Referring to FIGS. 7 and 8 wherein the $\underline{A}$ grouping of contacts is shown, when, as illustrated in FIG. 7, the sensing member 130 is positioned on the surface of the card 20, which is the normal position of the sensing member, the break contact 136 is positioned a greater distance from the surface of the card than the make contact 140. Consequently, the transfer contact 138 is in engagement with the break contact 136 and separated from the make contact 140. The break contact 136 and the transfer contact 138 therefore combine to provide a pair of normally closed contacts, indicated by the subnumeral one, while the make contact 140 and the transfer contact combine to provide a pair of normally open contacts, indicated by the subnumeral two.

When, however, the code hole 24 moves in front of the sensing member 130, as illustrated in FIG. 8, the sensing member moves into the hole and the break contact 136 moves therewith. In this position of the sensing member 130, the break contact 136 is positioned closer to the surface of the card 20 than the make contact 140, and therefore the transfer contact 138 is in engagement with the make contact and separated from the break contact. Hence, the normally closed contacts are open and the normally open contacts are closed.

It is to be noted that as the sensing member 130 moves from a position on the surface of the card 20 to a position in a code hole 24 in the card, there is a make-before-break transfer of the contacts. The transfer contact 138 moves with the break contact 136 until the transfer contact is arrested by its engagement with the make contact 140. The break contact 136 continues moving with the sensing member 130, and thus immediately thereafter the break contact 136 separates from the transfer contact 138. It is seen from the above that the switches $\underline{A}$ through $\underline{S}$ are actuated responsive to the coding on the card 20, and thus they are properly referred to as code actuated switches or, more briefly, code switches.

Although three contacts are provided for each code switch, not all three contacts are utilized in each switch. In the code switch $\underline{S}$ only the break contact 136 and the transfer contact 138 are used, and thus the switch only has a pair of normally closed contacts $\underline{S}_1$.

Figures 9, 10, 12, 16:
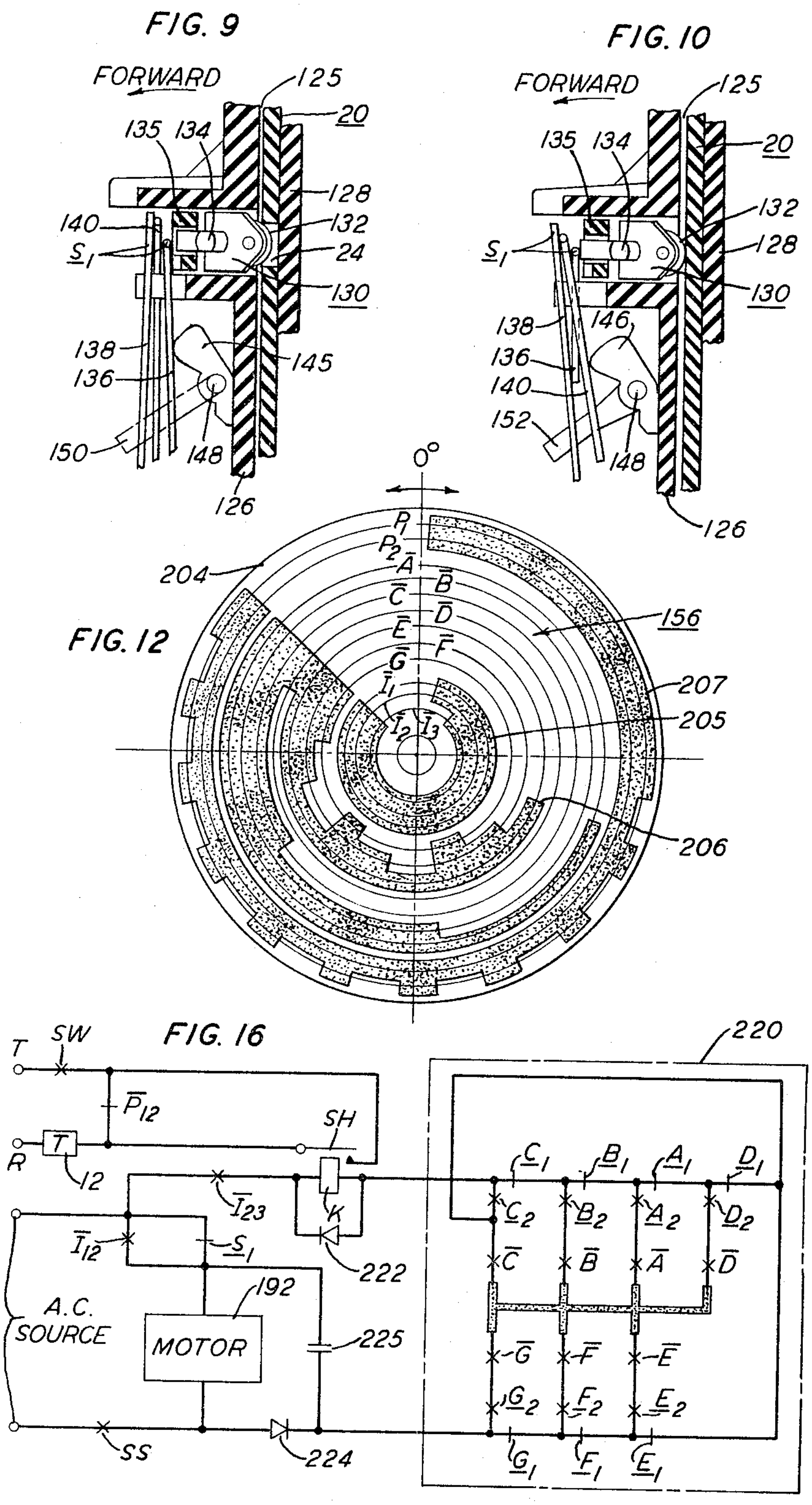
FIG. 9 is a sectional view of the code transmitter taken along line 9—9 of FIG. 6 showing the interaction between the start cam and the stop switch of the code actuated switching means.
FIG. 10 is a sectional view of the code transmitter taken along line 10—10 of FIG. 6 showing the interaction between the release cam and the stop switch of the code actuated switching means.
FIG. 12 is a plan view of the programmed member of the translating means.
FIG. 16 is a schematic circuit diagram of the code transmitter.

Turning now also to FIGS. 9 and 10, the code switch $\underline{S}$ is associated with the sensing member 130 actuated responsive to the coding of the $\underline{s}$ or stop column (FIG. 2) of the card 20, and a start cam 145 and a release cam 146 are respectively associated with the break contact 136 and the make contact 140 of the switch. The start cam 145 is fixedly mounted on a shaft 148 that is rotatively secured to the plate 126 intermediate the plate and the contacts, and the shaft includes a start lever 150 that extends forwardly therefrom. The release cam 146 is rotatively mounted on the shaft 148, and the cam includes a release lever 152 that extends forwardly therefrom.

The start lever 150 underlies the rearwardly extending finger 54 (FIG. 3) of the start plunger 45, and when the start button 18 is depressed, the finger engages the start lever and pivots the start cam 145 in a forward direction. As shown in FIG. 9, the start cam 145 engages the break contact 136 and moves it away from its normal resting position on the sensing member 130, and the break contact in turn engages the transfer contact 138 and moves it away from the sensing member. Thus the depression of the start button 18 assures engagement between the break contact 136 and the transfer contact 138 or, in other words, assures that the normally closed contacts $\underline{S}_1$ are closed.

The release lever 152 underlies the rearwardly extending finger 51 (FIG. 3) of the release plunger 44, and when the release button 17 is depressed, the finger engages the release lever and pivots the release cam 146 in a forward direction. As shown in FIG. 10, the release cam 146 engages the make contact 140 and moves it away from its normal resting position on the datum bar 135, and the make contact in turn engages the transfer contact 138 and moves it away from the break contact member 136. Thus depression of the release button 17 assures disengagement between the break contact 136 and the transfer contact 138 or, in other words, assures that the normally closed contacts $\underline{S}_1$ are open.

Referring now to FIGS. 11 and 13, the translating means of the code transmitter further comprises sequentially actuated switching means 155 including a programmed member 156. The programmed member 156 is disposed about a sleeve 158 that extends through a center aperture therein, and the sleeve is in turn disposed about a shaft 160, the lower end of the sleeve having a notched hub that mates with a toothed flange on the shaft and keys the sleeve to the shaft. A spring keeper 162 is disposed about the sleeve 158 and rests on the programmed member 156, and a cam 164 is disposed about the sleeve and rests on the spring keeper. The programmed member 156, the spring keeper 162, and the cam 164 are all keyed to the sleeve 158, and a nut 165 threaded onto the upper end of the shaft 160 secures the programmed member, spring keeper, cam, and sleeve in place.

The shaft 160 is journaled between an upper support plate 166 and a lower support plate 168, the lower support plate being mounted to and extending between the side plates 34 and 35 and the upper support plate being mounted to and spaced from the lower support plate by posts 170. A clutch 172 is disposed about the lower end of the shaft 160, and the clutch comprises an upper clutch plate 174 that is rotatively mounted on the shaft and a lower clutch plate 175 that is fixedly mounted to the shaft. The upper clutch plate 174 is secured to a gear 176 that is also rotatively mounted on the shaft 160, and a compression spring 178 disposed about the shaft between the gear and the upper support plate bears against the gear and biases the upper clutch plate into engagement with the lower clutch plate 175. The engaging surfaces of the upper and lower clutch plates 174 and 175 are toothed to provide positive transmission of motion therebetween.

The engagement and disengagement of the clutch plates 174 and 175 are controlled by the release lever 52 (FIG. 5) and a relay K. The laterally extending finger 53 of the release lever 52 overlies a link 182 pivotally mounted on the shaft 115 adjacent to the bell crank 114, and the free end of the link overlies one end of a clutch fork 184. The clutch fork 184 is pivotally mounted between two of the posts 170 and includes a pair of arms 185, only one of which is seen, that extend into engagement with the underside of the gear 176 on either side of the clutch 172.

When the release arm 52 is pivoted downward by the depression of the release plunger 44 (FIG. 5), the laterally extending finger 53 moves the free end of the link 182 down against the adjacent end of the clutch fork 184. The clutch fork 184 is pivoted in a clockwise direction as viewed in FIG. 14 and the arms 185 displace the gear 176 and thereby the upper clutch plate 174 upwardly along the shaft 160 and thereby disengage the upper clutch plate 174 from the lower clutch plate 175. In addition, one of the arms 185 of the clutch fork 184 has a finger 186 that underlies a normally open shorting switch SH and when the arms 185 are pivoted upward to disengage the clutch 172, the finger closes the shorting switch. The shorting switch SH forms part of the signal generating means of the code transmitter.

Upon the return of the release plunger 44 (FIG. 5) to an upward position under the bias of the spring 48, the release lever 52 is pivoted upward, raising the laterally extending finger 53. The compression spring 178 thereupon biases the upper clutch plate 174 into engagement with the lower clutch plate 175 and the gear 176 moves the arms 185 of the clutch fork 184 downward, permitting the normally open shorting switch SH to open. The other end of the clutch fork 184 moves upward and raises the link 182 into engagement with the laterally extending finger 53.

Figure 14:
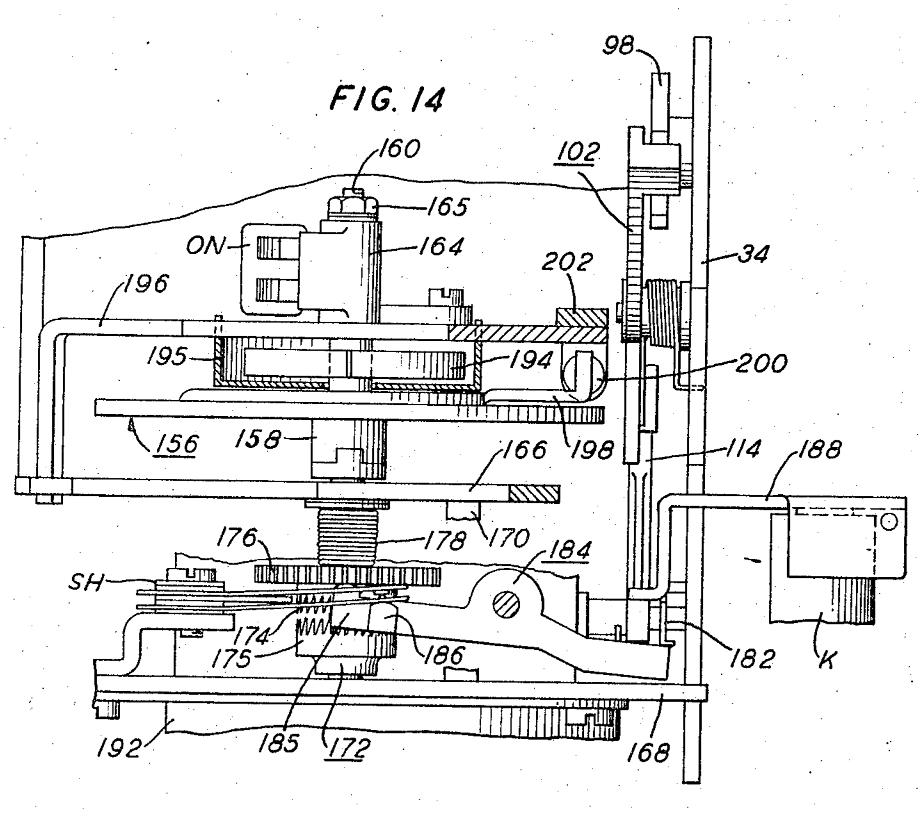
FIGS. 14 and 15 are respectively essentially the same as FIGS. 11 and 13 except for showing the relationship between elements of the translating means when the relay thereof is actuated.

The relay K has an armature 188 that overlies a horizontal leg of the bell crank 114, and the horizontal leg in turn overlies the same end of the clutch fork 184 as the link 182. As shown in FIGS. 14 and 15, when the relay K is energized, the armature 188 is moved downward, pivoting the bell crank 114 in a rearward direction. The horizontal leg of the bell crank 114 operates the clutch fork 184 to disengage the clutch 172 and to close the normally open shorting switch SH, and the vertical leg of the bell crank operates the escapement pawl 102 to permit the ratchet wheel 98 to advance forty-five degrees.

Upon the de-energization of the relay K, the torsion spring 106 rotates the escapement pawl 102 in a rearward direction permitting the ratchet wheel 98 to advance another forty-five degrees, and the pawl in turn rotates the bell crank 114 in a forward direction. At the same time, the compression spring 178 engages the clutch 172 and pivots the clutch fork 184 so as to open the shorting switch SH and rotate the bell crank 114 in a forward direction. The horizontal leg of the bell crank 114 is thereby moved upward, and it raises the armature 188 of the relay K.

A gear train 190 couples the gear 176 to a synchronous motor 192 and when the motor is energized it rotates the gear from right to left as viewed in FIGS. 11 and 13. This rotation of the gear 176 is transmitted to the shaft 160 when the clutch 172 is engaged, and the shaft in turn transmits the rotation through the sleeve 158 to the programmed member 156, the spring keeper 162 and the cam 164.

A coil spring 194 has one end thereof fastened to the spring keeper 162 and the other end thereof fastened to a housing 195 depending from a mounting plate 196, the mounting plate being secured to the upper support plate 166. The rotation of the spring keeper 162 by the motor 192 winds up the coil spring 194 and stores energy therein, and when the clutch 172 is disengaged, the coil spring counter-rotates the spring keeper 162 and thereby the programmed member 156, the cam 164, the sleeve 158, the shaft 160, and the lower clutch plate 175 from left to right as viewed in FIGS. 11 and 13. The counter-rotation of these elements is terminated upon the engagement of an arresting arm 198 affixed to the programmed member 156 with an energy absorbing bumper 200 on a stop 202 fastneed to and depending from the mounting plate 196. This rest position of the elements is referred to as the home position and for reference purposes is considered to be the normal position.

Referring now also to FIG. 12, the programmed member 156 comprises a dielectric disc 204 having conductive patterns 205, 206, and 207 printed on the undersurface thereof, and a row of twelve bifurcated wire spring contacts extend into engagement with this surface. The contacts, which are spaced along a radius of the programmed member 156, are mounted in a block 208 secured to the upper support plate 166, the block insulating the contacts one from the other and maintaining the spacing therebetween. The contacts are identified as $\overline{P}_1$, $\overline{P}_2$, $\overline{A}$, $\overline{B}$, $\overline{C}$, $\overline{D}$, $\overline{E}$, $\overline{F}$, $\overline{G}$, $\overline{I}_1$, $\overline{I}_2$, and $\overline{I}_3$, and for ease of description a grid is superimposed on the programmed member 156 to show the paths followed by the individual contacts as the programmed member is rotated.

It is seen that when the programmed member 156 is in the home position, the contacts $\overline{A}$, $\overline{B}$, $\overline{C}$, $\overline{D}$, $\overline{E}$, $\overline{F}$, $\overline{G}$, $\overline{I}_1$, $\overline{I}_2$, and $\overline{I}_3$ all rest directly on the dielectric disc 204, and hence there is no interconnection between the contacts. When, however, the programmed member 156 is rotated from the home position through a distance of twenty degrees, the programmed member being rotated in a counterclockwise direction as viewed in FIG. 12, the contacts $\overline{I}_1$ and $\overline{I}_2$ close, the contacts being interconnected by the conductive pattern 205. And upon the rotation of the programmed member 156 through an additional twenty-five degrees, the contact $\overline{I}_3$ also engages the conductive pattern 205 and closes with the contacts $\overline{I}_1$ and $\overline{I}_2$.

Thereafter, the contacts $\overline{A}$ and $\overline{E}$ are closed by the conductive pattern 206, after which the contacts $\overline{F}$ and then the contacts $\overline{G}$ close in sequence. The contacts $\overline{F}$ and $\overline{G}$ then both open, following which the contacts $\overline{B}$ close. The contacts $\overline{F}$ and the contacts $\overline{G}$ again close in sequential order, and then both open again, after which the contacts $\overline{C}$ close. The contacts $\overline{F}$ and the contacts $\overline{G}$ sequentially close for a third time, and then the contacts $\overline{D}$ close. At this point all the contacts are closed. This sequence or a portion thereof is continuously repeated during the operation of the code transmitter, and hence these contacts actuated responsive to the rotation of the programmed member 156 are properly referred to as sequentially actuated contacts or, more briefly, sequence contacts.

In the schematic circuit diagram of FIG. 12, the sequence contacts $\overline{I}_1$, $\overline{I}_2$, and $\overline{I}_3$ and their interaction with the conductive pattern 205 are represented by pairs of normally open sequence contacts $\overline{I}_{12}$ and $\overline{I}_{23}$. The sequence contacts $\overline{A}$, $\overline{B}$, $\overline{C}$, $\overline{D}$, $\overline{E}$, $\overline{F}$, and $\overline{G}$ and their interaction with the conductive pattern 206 are respectively represented by pairs of normally open sequence contacts of the same letters.

In addition to actuating these switches, the rotation of the shaft 160 results in the actuation of an off normal switch ON. As seen in FIG. 4, the off normal switch ON comprises a stationary contact member 210 and a movable member 212, the contact members being fastened to a mounting plate 214. The movable contact member 212 extends into juxtaposition with the cam 164 and when the cam is in the home position it deflects the movable contact member away from the stationary contact member 210 whereby the off normal switch ON is open. Upon rotation of the cam 164 from the home position through an angular distance of forty-five degrees, the cam being rotated in a clockwise direction as viewed in FIG. 4, the movable contact member 212 is permitted to move into engagement with the stationary contact member 210 and the off normal switch ON closes.

*Signal generating means*

The means under the control of the translating means for generating signals consist of the normally open shorting switch SH and the contacts $\overline{P}_1$ and $\overline{P}_2$, the latter interacting with the conductive pattern 207 on the programmed member 156. The contacts $\overline{P}_1$ and $\overline{P}_2$ are closed in the home position of the programmed member 156 and remain closed until the programmed member has rotated through an angular distance of one hundred degrees. Thereafter the contacts $\overline{P}_1$ and $\overline{P}_2$ commence to repeatedly open for fourteen degrees and four minutes of rotation and close for eight degrees and twenty-six minutes of rotation. As hereinafter described, each opening and closing of the contacts $\overline{P}_1$ and $\overline{P}_2$ results in the generation of a pulse out on a telephone line, and hence one pulse is generated for every twenty-two degrees and thirty minutes of rotation. The programmed member 156 is designed to rotate at a speed to provide one pulse every one hundred milliseconds or ten pulses per second, and the conductive pattern 207 provides a break time of sixty-one milliseconds and a make time of thirty-nine milliseconds for each pulse. The conductive pattern 206 is designed so that the sequence contacts $\overline{A}$ through $\overline{G}$ close two degrees ahead of the closing of the pulsing contacts $\overline{P}_1$ and $\overline{P}_2$. When the sequence contacts open they open seven degrees ahead of the closing of the pulsing contacts $\overline{P}_1$ and $\overline{P}_2$. In the schematic circuit diagram of FIG. 16, the pulsing contacts $\overline{P}_1$ and $\overline{P}_2$ and their interaction with the conductive pattern 207 are represented by a pair of normally closed pulsing contacts $\overline{P}_{12}$.

*Electrical description*

Referring now to FIG. 16, the motor 192 is connected across a source of alternating current, the motor being connected to one side of the alternating current source through either of the normally open sequence contacts $\overline{I}_{12}$ or the normally closed code contacts $\underline{S}_1$ and being connected to the other side of the alternating current source through the normally open start switch SS.

Also connected across the alternating current source is a switching matrix 220. The switching matrix 220 is connected to one side of the alternating current source through the normally open sequence contacts $\overline{I}_{23}$ and the relay K, the relay having a voltage regulating diode 222 connected in parallel therewith. The switching matrix 220 is connected to the other side of the alternating current source through a rectifying diode 224 and the normally open start switch SS, the rectifying diode in combination with a capacitor 225 serving to partially rectify the current flowing through the switching matrix circuit.

The switching matrix 220 comprises the normally open code contacts $\underline{A}_2$, $\underline{B}_2$, $\underline{C}_2$, $\underline{D}_2$, $\underline{E}_2$, $\underline{F}_2$, and $\underline{G}_2$ respectively connected in series with the normally open sequence contacts $\overline{A}$, $\overline{B}$, $\overline{C}$, $\overline{D}$, $\overline{E}$, $\overline{F}$, and $\overline{G}$ to form a plurality of branches. The A, B, C, and D branches are connected in parallel to form a first parallel network and the E, F, and G branches are connected in parallel to form a second parallel network, and the two parallel networks are connected in series with one another. In addition, the normally open code contacts $\underline{C}_2$ and $\underline{B}_2$ are connected in series by the normally closed code contacts $\underline{C}_1$, the normally open code contacts $\underline{B}_2$ and $\underline{A}_2$ are connected in series by the normally closed code contacts $\underline{B}_1$, the normally open code contacts $\underline{A}_2$ and $\underline{D}_2$ are connected in series by the normally closed code contacts $\underline{A}_1$, the normally open code contacts $\underline{D}_2$ and $\underline{E}_2$ are connected in series by the normally closed code contacts $\underline{D}_1$ and $\underline{E}_1$, the normally open code contacts $\underline{E}_2$ and $\underline{F}_2$ are connected in series by the normally closed code contacts $\underline{F}_1$, and the normally open code contacts $\underline{F}_2$ and $\underline{G}_2$ are connected in series by the normally closed code contacts $\underline{G}_1$. Furthermore, a shunt path is provided from a point intermediate the normally open code contacts $\underline{C}_2$ and the normally open sequence contacts $\overline{C}$ to a point intermediate the normally closed code contacts $\underline{D}_1$ and $\underline{E}_1$.

The telephone set 12 with which the code transmitter is associated is of the conventional type such as that disclosed in Patent 2,629,783 issued to H. F. Hopkins on Feb. 24, 1953 and assigned to the assignee of this invention. The telephone set 12 is connected directly to the ring side of the telephone line and connected to the tip side of the telephone line through the normally closed pulsing contacts $\overline{P}_{12}$ and a pair of normally open switchhook contacts SW. The normally open shorting switch SH is connected in parallel with the normally colsed pulsing contacts $\overline{P}_{12}$.

Though not shown, the normally open off normal switch ON (FIG. 4) is connected in parallel with the receiver of the telephone set and thereby shorts the receiver during the transmission of pulses.

*Description of operation*

In the description of operation that follows, the description will relate to FIGS. 2, 12, and 16 and to the figure set forth in parentheses, the figure in parentheses applying until a subsequent figure in parentheses is set forth. It will be assumed that the call transmitter is being used in an office served by a private branch exchange.

The subscriber begins the operation of the code transmitter by selecting the card 20 (FIG. 1) that is coded with the telephone number of the subscriber he wishes to call. For purposes of the present description it will be assumed that the encoded card 20 selected is the card shown in FIG. 2. The encoded card 20 is placed in the entryway 16, and the card is inserted to its full height, whereupon the columns of sprocket holes 28 and 29 of the card respectively engage the sprockets 72 and 74 (FIG. 4) of the scanning means and rotate them in a forward direction. The forward rotation of the sprockets 72 and 74 moves the tab 84 of the sprocket 74 away from the flange 82 of the link 80 whereby the detent 64 is no longer restrained by the link.

The forward rotation of the sprockets 72 and 74 also winds up the motor spring 76 and drives the gear 88, and the interaction between the gear and the pinion 90 rotates the face ratchet 95 rearwardly. As the face ratchet 95 rotates rearwardly, it slides past the face ratchet 96, the band clutch 100 preventing the ratchet wheel 98 and thereby the face ratchet 96 from rotating rearwardly. When the encoded card 20 is fully inserted into the entryway 16, the subscriber removes his hand from the card and the motor spring 76 acting through the gear 88 and pinion 90 biases the face ratchet 95 in a forward direction. The teeth on the face ratchet 95 move into locking engagement with the teeth on the face ratchet 96, and inasmuch as the ratchet wheel 98 is prevented from rotating forwardly by the forward boss 110 (FIG. 13) on the escapement pawl 102, the motor spring 76 (FIG. 4) is prevented from rotating the sprockets 72 and 74 in a rearward direction to move the card 20 out of the entryway 16.

With the encoded card 20 fully inserted into the entryway 16, the card is positioned with the first row of discs 22 presented to the row of sensing members 130 (FIG. 6). As the digit nine is encoded in the first row of the card 20, code holes 24 are formed in the C and G columns. The sensing members 130 associated with the switches $\underline{C}$ and $\underline{G}$ are biased by the switches into the holes 24, and consequently the normally closed contacts $\underline{C}_1$ and $\underline{G}_1$ open and the normally open contacts $\underline{C}_2$ and $\underline{G}_2$ close.

The subscriber removes the handset 15 (FIG. 1) from the switchhook 14, thereby closing the normally open switchhook contacts SW, and the telephone set 12 is connected across the telephone line. A path is provided from the tip side of the telephone line through the closed normally open switchhook contacts SW, the closed normally closed pulsing contacts $\overline{P}_{12}$, and the telephone set 12 to the ring side of the telephone line.

The subscriber listens for a dial tone, and hearing one, he depresses the start button 18 (FIG. 3). The depression of the start button 18 moves the start plunger 45 downwardly, and the arm 55 thereof pivots the start latch 56 downwardly. The detent 64 is no longer restrained by the notch 60 of the start latch 56 and the movable contact spring 68 is thereby free to rotate the detent and close on the stationary contact spring 70, closing the normally open start switch SS. The motor 192 is thereby energized, a path being provided from one side of the power source through the closed normally closed code contacts $\underline{S}_1$, the motor 192, and the closed normally open start switch SS to the other side of the power source.

The energized motor 192 (FIG. 11) acting through the gear train 190, the gear 176, and the clutch 172 rotates the programmed member 156 in a counterclockwise direction as viewed in FIG. 12. Upon the rotation of the programmed member 156 through twenty degrees the normally open sequence contacts $\overline{I}_{12}$ close, providing a shunt around the closed normally closed code contacts $\underline{S}_1$, and upon an additional twenty-five degrees of rotation the normally open sequence contacts $\overline{I}_{23}$ close, connecting the switching matrix 220 across the power source.

After the programmed member 156 has been rotated through an angular distance of one hundred degrees the normally closed pulsing contacts $\overline{P}_{12}$ commence to open and close thereby interrupting the telephone line and transmitting pulses thereover. During the first pulse the normally open sequence contacts $\overline{A}$ and $\overline{E}$ close, during the second pulse the normally open sequence contacts $\overline{F}$ close, and during the third pulse the normally open sequence contacts $\overline{G}$ close. During the fourth pulse the normally open sequence contacts $\overline{F}$ and $\overline{G}$ open and then the normally open sequence contacts $\overline{B}$ close. During the fifth and sixth pulses the normally open sequence contacts $\overline{F}$ and $\overline{G}$ respectively close, and during the seventh pulse they again open followed by the closing of the normally open sequence contacts $\overline{C}$, and during the eighth pulse the normally open sequence contacts $\overline{F}$ close.

Finally, during the ninth pulse the normally open sequence contacts $\overline{G}$ close and a path is provided through the switching matrix 220. Current flows from one side of the power source through the closed normally open start switch SS, the rectifying diode 224, the closed normally open code contacts $\underline{G}_2$, the closed normally open sequence contacts $\overline{G}$, the closed normally open sequence contacts $\overline{C}$, the closed normally open code contacts $\underline{C}_2$, the relay K, and the closed normally open sequence contacts $\overline{I}_{23}$ to the other side of the power source, and the relay K is energized. Although the relay is energized during a pulse, due to the inertia of the system, the pulse is completed before any change occurs due to the energization of the relay.

The energization of the relay K (FIGS. 14 and 15) moves the armature 188 thereof downward pivoting the bell crank 114 in a rearward direction. The vertical leg of the bell crank 114 rotates the escapement pawl 102 in a forward direction, moving the forward boss 110 out of and the rearward boss 108 into the path of the teeth on the ratchet wheel 98. The ratchet wheel 98 under the bias of the motor spring 76 (FIG. 4) rotates forwardly until a tooth thereon engages the rearward boss 108 and this motion is transmitted through the face ratchets 95 and 96, the pinion 90, and the gear 88 to the sprockets 72 and 74. The sprockets 72 and 74 rotates rearwardly through a distance to move the card 20 upward half the distance between the rows of discs 22, and as a result, the area between the rows of discs is presented to the sensing members 130 (FIG. 7). Since all the sensing members rest on the card, all of the code switches are in a normal condition and consequently the relay K remains energized, a path being provided from one side of the power source through the closed normally open start switch SS, the rectifying diode 224, the closed normally closed contacts $\underline{G}_1$, $\underline{F}_1$, $\underline{E}_1$, $\underline{D}_1$ $\underline{A}_1$, $\underline{B}_1$, and $\underline{C}_1$, the relay K, and the closed normally open sequence contacts $\overline{I}_{23}$ to the other side of the power source.

At the same time, the horizontal leg of the bell crank 114 (FIGS. 14 and 15) rotates the clutch fork 184 in a clockwise direction, and the arms 185 of the clutch fork disengage the upper clutch plate 174 from the lower clutch plate 175 while the finger 186 closes the shorting switch SH. The gear 176 and upper clutch plate 174 rotate about the shaft 160, the gear being driven by the motor 192 acting through the gear train 190, but with the disengagement of the clutch 172, the only force acting on the shaft is the bias of the coil spring 194. Hence the coil spring 194 counter-rotates the shaft 160 and thereby the programmed member 156 until the rotation is terminated by the engagement of the arresting arm 198 mounted on the programmed member with the bumper 200 on the stop 202 at which point the programmed member is in the home position.

As the programmed member 156 counter-rotates to the home position, the pulsing contacts $\overline{P}_{12}$ open and close. However, the telephone line is not interrupted as a shunt path is provided around the pulsing contacts by the closed normally open shorting switch SH. In addition, when the programmed member 156 counter-rotates to the forty-five degree position, the normally open sequence contacts $\overline{I}_{23}$ open and the switching matrix circuit is interrupted, the relay K being thereby de-energized. However, due to the inertia of the system, the programmed member 156 is able to counter-rotate to the home position before any change occurs due to the de-energization of the relay K. Finally, when the programmed member 156 counter-rotates to the twenty degree position, the normally open sequence contacts $\overline{I}_{12}$ open.

The de-energization of the relay K permits the torsion spring 106 (FIGS. 11 and 13) to rotate the escapement pawl 102 in a rearward direction, moving the rearward boss 108 out of and the forward boss 110 into the path of the teeth on the ratchet wheel 98 and causing the follower 112 to rotate the bell crank 114 in a forward direction. The ratchet wheel 98 under the bias of the motor spring 76 (FIG. 4) rotates forwardly until a tooth thereon engages the forward boss 110, and this motion is transmitted through the face ratchets 95 and 96, the pinion 90, and the gear 88 to rotate the sprockets 72 and 74 rearwardly, the sprockets again moving the card 20 upward half the distance between the rows of discs 22. The second row of discs 22 is presented to the sensing members 130, and as the digit two is encoded therein, code holes 24 appear in the $\underline{a}$ and $\underline{f}$ columns. Furthermore, a code hole 24 appears in the $\underline{s}$ or stop column of the second row. The sensing members 130 (FIG. 8) associated with the code switches $\underline{A}$, $\underline{F}$, and $\underline{S}$ move into the juxtaposed code holes 24, and the normally closed code contacts $\underline{A}_1$, $\underline{F}_1$, and $\underline{S}_1$ open while the normally closed code contacts $\underline{A}_2$ and $\underline{F}_2$ close. The opening of the normally closed code contacts $\underline{S}_1$ interrupts the connection of the motor 192 across the source of alternating current, and the motor is de-energized.

At the same time (FIGS. 11 and 13) the compression spring 178 acts on the gear 176 to move the upper clutch plate 174 into engagement with the lower clutch plate 175 and to rotate the clutch fork 184 in a counterclockwise direction, thereby permitting the normally open shorting switch SH to open. The combined action of the escapement pawl 102 and the clutch fork 184 rotates the bell crank 114 in a forward direction, the horizontal leg of the bell crank raising the armature 188 of the relay K.

Assuming that the purpose of the first digit is to gain access to an outside trunk line, the subscriber listens for a dial tone indicating that a trunk line is available, and upon hearing the dial tone, he depresses the start button 18 (FIG. 3). The depression of the start button 18 moves the start plunger 45 downward whereupon the rearwardly extending finger 54 thereof engages the start lever 150 (FIG. 9) and pivots the start cam 145 in a forward direction. The start cam 145 engages the break contact 136 and moves it into engagement with the transfer contact 138, disengaging the transfer contact from the make contact 140. Thus the normally closed code contacts $\underline{S}_1$ close, and the motor 192 is again connected across the alternating current power source.

The energized motor 192 again rotates the programmed member 156 in a counterclockwise direction winding up the coil spring 194 (FIG. 11), and after the programmed member rotates through twenty degrees, the normally open sequence contacts $\overline{I}_{12}$ close, providing a shunt around the normally closed code contacts $\underline{S}_1$. Thus when the subscriber removes his finger from the start button 18 (FIG. 3) and the torsion spring 48 moves the start plunger 45 to its upward position, permitting the start cam 145 (FIG. 9) to return to its normal position and the code contacts $\underline{S}_1$ to open, the connection of the motor 192 across the alternating current power source is maintained.

As the rotation of the programmed member 156 continues, the normally open sequence contacts $\overline{I}_{23}$ close, a first pulse is transmitted during which the normally open sequence contains $\overline{A}$ and $\overline{E}$ close, and a second pulse is transmitted during which the normally open sequence contacts $\overline{F}$ close. With the closing of the normally open sequence contacts $\overline{F}$ a path is provided through the switching matrix, current flowing from the power source through the closed normally open start switch SS, the rectifying diode 224, the closed normally closed code contacts $\underline{G}_1$, the closed normally open code contacts $\underline{F}_2$, the closed normally open sequence contacts $\overline{F}$ and $\overline{A}$, the closed normally open code contacts $\underline{A}_2$, the closed normally closed code contacts $\underline{B}_1$ and $\underline{C}_1$, the relay K, and the closed normally open sequence contacts $\overline{I}_{23}$ to the other side of the power source.

The relay K is energized, and the armature 188 (FIGS. 14 and 15) thereof operates the escapement pawl 102 to step the card 20 upwardly half the distance between the rows of discs 22, thereby maintaining the path through the switching matrix, and operates the clutch fork 184 to disengage the clutch 172, thereby permitting the coil spring 194 to counter-rotate the programmed member 156 to the home position and to close the normally open shorting switch SH to prevent the transmission of pulses. As the programmed member 156 counter-rotates to the home position, the normally open sequence contacts $\overline{I}_{23}$ open, interrupting the flow of current through the switching matrix circuit. Shortly after the programmed member returns to the home position, the card 20 is stepped to present the third row of discs 22 and the clutch 172 is engaged to permit the motor 192 to again rotate the programmed member. It is to be noted that the time required to counter-rotate the programmed member to the home position and then rotate it to the point at which the first pulse is transmitted provides the interdigital period.

The third row of discs 22 in the card 20 has the digit zero encoded thereon, and as set forth in the general description, the digit zero may be coded either by forming a code hole 24 in the $\underline{d}$ column or in the $\underline{d}$ and $\underline{f}$ columns. In either case, no path is provided through the switching matrix until the tenth pulse is transmitted, at which point all the sequence contacts close. If the code hole 24 is formed in just the $\underline{d}$ column, whereby the code switch D is actuated to open the normally closed contacts $\underline{D}_1$ and to close the normally open contacts $\underline{D}_2$, a path is provided from one side of the power source through the closed normally open start switch SS, the rectifying diode 224, the closed normally closed code contacts $\underline{G}_1$, $\underline{F}_1$, and $\underline{E}_1$, the closed normally open sequence contacts $\overline{C}$ and $\overline{D}$, the closed normally open code contacts $\underline{D}_2$, the closed normally closed code contacts $\underline{A}_1$, $\underline{B}_1$, and $\underline{C}_1$, the relay K, and the closed normally open sequence contacts $\overline{I}_{23}$ to the other side of the power source. If, on the other hand, a code hole 24 is formed in both the $\underline{d}$ and $\underline{f}$ columns, whereby the code switches D and F are actuated to respectively open the normally closed contacts $\underline{D}_1$ and $\underline{F}_1$ and close the normally open contacts $\underline{D}_2$ and $\underline{F}_2$, a path is provided from one side of the power source through the closed normally open start switch SS, the rectifying diode 224, the closed normally closed code contacts $\underline{G}_1$, the closed normally open code contacts $\underline{F}_2$, the closed normally open sequence contacts $\overline{F}$ and $\overline{D}$, the closed normally open code contacts $\underline{D}_2$, the closed normally closed code contacts $\underline{A}_1$, $\underline{B}_1$, and $\underline{C}_1$, the relay K, and the closed normally open sequence contacts $\overline{I}_{23}$ to the other side of the power source.

When transmitting the fourth and subsequent digits of the telephone number, the code transmitter repeats the above pattern of operation and after the last digit is transmitted, the coding on the $\underline{s}$ or stop column results in the motor 192 being disconnected from the power source and the operation of the code transmitter being halted. The subscriber then listens for the called party to answer. If the line is busy, the encoded card 20 is in position to be fully reinserted into the entryway 16 to again call the party after a delay of a few minutes.

After the call is completed, the subscriber returns the handset 15 (FIG. 1) to the switchhook 14, thereby opening the normally open switchhook contacts SW to disconnect the telephone set 12 from the telephone line, and depresses the release button 17 to release the card 20. The release plunger 44 (FIG. 3) and thereby the obliquely extending arm 50 and the rearwardly extending finger 51 are moved downward and the release lever 52 is pivoted downward. The downward movement of the obliquely extending arm 50 deflects the release arm 116 of the scanning means toward the auxiliary plate 40 (FIG. 4), moving the pinion 90 away from the ratchet wheel 98. The face ratchets 95 and 96 are thereby disengaged and the motor spring 76 rotates the sprockets 72 and 74 to move the card 20 out of the entryway 16, the speed at which the sprockets rotate being limited by the interaction between the brake 122 and the star wheel 94.

The downward movement of the rearwardly extending finger 51 rotates the release cam 146 (FIG. 10) in a forward direction. The release cam 146 engages the make contact 140 and moves it into engagement with the transfer contact 138, deflecting the transfer contact away from the break contact 136. This prevents the normally closed code contacts $\underline{S}_1$ from closing as the card is moved out of the entryway 16. The closing of the normally closed code contacts $\underline{S}_1$ would connect the motor 192 across the power source and reinstitute the operation of the code transmitter, and this is undesirable.

The downward pivoting of the release lever 52 (FIG. 5) moves the laterally extending finger 53 thereof into engagement with the link 182 (FIG. 15), moving it downward, and the link rotates the clutch fork 184 (FIG. 14) to disengage the clutch 172 and close the normally open shorting switch SH. This assures that the programmed member 156 is returned to the home position and prevents any interruption of the telephone line if, for example, the card 20 is released while the subscriber is conversing with the called party.

The sprockets 72 and 74 (FIG. 4) under the bias of the motor spring 76 continue to rotate until the motion thereof is arrested by the engagement of the tab 84 on the sprocket 74 with the flange 82 of the link 80, the rotation of the link having been arrested by the engagement of the flange with the stop 85. At this point the card 20 is moved to a threshold position in the entryway 16, and the teeth on the sprocket 72 and 74 are disengaged from the columns of sprocket holes 28 and 29. The flange 82 in moving into engagement with the stop 85 engages the ridge 65 on the detent 64 and rotates the detent so as to move the vane 62 into the notch 60 in the start latch 56. The vane 62 in turn opens the normally open start switch SS and thereby disconnects the code transmitter.

If a power failure should occur during the operation of the code transmitter, thereby terminating the operation thereof, it is seen from the foregoing that by depressing the release button 17, the programmed member 156 is returned to the home position, the encoded card 20 is released, and the code transmitter is disconnected from its power source. By returning the programmed member 156 to the home position, the closing of the pulsing switch $\overline{P}_{12}$ is assured, and with the pulsing switch $\overline{P}_{12}$ closed, the telephone set 12 may always be operated manually. This therefore provides a fail safe feature that always allows for the operation of the telephone set 12 regardless of the operability of the code transmitter.

If no code hole 24 is coded in the $\underline{s}$ or stop column after the final coded digit, the code transmitter continues to operate and steps the card 20 out of the entryway 16 until the card is moved to the threshold position, whereupon the code transmitter is shut down by the opening of the normally open start switch SS in the above-described manner. It is to be noted that when no digit is encoded in a row of discs 22, all the code actuated switches are in their normal position. Thus a path is provided through the switching matrix upon the closing of the normally open sequence contacts $\overline{I}_{23}$, current flowing from one side of the power source through the closed normally open start switch SS, the rectifying diode 224, the closed normally closed code contacts $\underline{G}_1$, $\underline{F}_1$, $\underline{E}_1$, $\underline{D}_1$, $\underline{A}_1$, $\underline{B}_1$, and $\underline{C}_1$, the relay K, and the closed normally open sequence contacts $\bar{I}_{23}$ to the other side of the power source.

What is claimed is:

1. A call transmitter operating in conjunction with a code bearing member having a plurality of digits identifying a telephone subscriber encoded thereon, the code transmitter comprising:
a plurality of switches actuated responsive to the coding on the code bearing member, particular ones of which are actuated in response to each encoded digit;
means for positioning a portion of the code bearing member having an individual digit encoded thereon in juxtaposition with the code actuated switches;
a programmed member having a particular pattern of conductive and nonconductive areas thereon;
a motor for rotating the programmed member in a particular direction;
a normally engaged clutch for connecting the motor to the programmed member;
a spring member energized by the rotation of the programmed member in the particular direction for returning the programmed member to a rest position when the clutch is disengaged;
a plurality of brushes extending into engagement with the surface of the programmed member, the interaction between the brushes and the conductive and nonconductive pattern of the programmed member providing a plurality of sequentially actuated switches and a pulsing switch;
means for connecting the pulsing switch across a telephone line;
a switching matrix comprising the sequentially actuated switches interconnected with the code actuated switches;
means for connecting the motor and the switching matrix to a source of electromotive force, the motor when energized rotating the programmed member whereby the sequentially actuated switches are actuated in a particular sequence and the pulsing switch opens and closes to interrupt the telephone line and transmit pulses thereover;
a relay connected in series with the switching matrix, the actuation of sequentially actuated switches corresponding to the actuated code actuated switches providing a path through the switching matrix to energize the relay;
means responsive to the energization of the relay for disengaging the clutch whereby the spring member is permitted to return the programmed member to the rest position;
means responsive to the energization of the relay for shorting the pulsing switch; and
means responsive to the energization of the relay for advancing the code bearing member to position another encoded digit in juxtaposition with the code actuated switches.

2. A call transmitter as in claim 1 wherein:
the programmed member is fixedly mounted on a rotatable shaft;
the clutch comprises a driving member rotatively mounted on the shaft and a driven member fixedly mounted on the shaft;
a spring member biases the driving member into engagement with the driven member; and
a gear train connects the motor to the driving member.

3. A code transmitter operating in conjunction with a code bearing member having individual bits of information serially encoded on discrete portions thereof, the call transmitter comprising:
a plurality of switches actuated responsive to the coding on the code bearing member;
means for positioning a discrete portion of the code bearing member in juxtaposition with the code actuated switches;
a programmed member;
motive means for moving the programmed member in a particular direction from a rest position;
normally engaged clutch means for connecting the motive means to the programmed member;
biasing means energized by the movement of the programmed member in the particular direction from the rest position for returning the programmed member to the rest position when the clutch is disengaged;
signal generating means actuated responsive to the movement of the programmed member from the rest position;
a plurality of switches sequentially actuated responsive to the movement of the programmed member from the rest position, the sequentially actuated switches being interconnected with the code actuated switches to form a switching matrix;
means for connecting the switching matrix to a source of electromotive force;
a relay connected in series with the connecting means and the switching matrix, the provision of a path through the switching matrix when the connecting means is operated resulting in the energization of the relay;
means responsive to the energization of the relay for disengaging the clutch means;
means responsive to the energization of the relay for disabling the signal generating means; and
means responsive to the energization of the relay for providing relative movement between the code bearing member and the code actuated switches to position another discrete portion of the code bearing member in juxtaposition with the code actuated switches.

4. A code transmitter as in claim 3 further including means for simultaneously displacing the code bearing member from in juxtaposition with the code actuated switches, returning the programmed member to the rest position, and disconnecting the switching matrix from the source of electromotive force.

5. A code transmitter operating in conjunction with a code bearing member having a plurality of bits of information encoded thereon, the code transmitter comprising:
a programmed member;
a plurality of switches sequentially actuated responsive to relative movement between the switches and the programmed member;
motive means for providing relative movement between the sequentially actuated switches and the programmed member;
means for generating an encoding signal concurrent with the actuation of the sequential switches;
normally engaged clutch means for connecting the motive means to the programmed member;
biasing means energized by the relative movement between the sequentially actuated switches and the programmed member for returning them to an initial relative position;
a plurality of switches actuated responsive to the coding on the code bearing member, the code actuated switches being interconnected with the sequentially actuated switches to form a switching matrix;
a relay connected in series with the switching matrix;
means for connecting the relay and switching matrix to a source of electromotive force; and
means responsive to the energization of the relay for disengaging the clutch means and for disabling the signal generating means.

6. A code transmitter comprising:
a plurality of switches;

means for actuating the switches in a particular sequence;

means for transmitting a signal concurrent with the actuation of each switch;

switching means for interconnecting the switches to form a switching matrix;

means responsive to the provision of a path through the switching matrix for reversing the operation of the switch actuating means to return to the beginning of the sequence; and means for blanking the transmission of signals during the reverse operation of the switch actuating means.

7. A code transmitter comprising:

a first switch actuator normally positioned in a rest position;

means for moving the first switch actuator from its rest position in a particular direction;

a plurality of first switches sequentially actuated responsive to the movement of the first switch actuator from its rest position;

means for transmitting a signal concurrent with each such sequential actuation of a first switch;

a second switch actuator;

a plurality of second switches actuated responsive to movement of the second switch actuator, each second switch being connected to one of the first switches to form a switching matrix; and means responsive to the provision of a path through the switching matrix for moving the first switch actuator in a direction opposite to the particular direction to return the first switch actuator to its rest position and for advancing the second switch actuator.

8. A code transmitter operating in combination with a code bearing member having a plurality of bits of information encoded thereon, the code transmitter comprising:

a switch actuator;

a plurality of first switches sequentially actuated responsive to movement of the switch actuator from a rest position, the switch actuator moving from the rest position in a particular direction and at a particular rate of speed;

means for generating a pulse concurrent with each actuation of a first switch whereby a train of pulses corresponding in length to the number of first switches actuated is generated for each movement of the switch actuator from the rest position;

a plurality of second switches actuated responsive to the coding on the code bearing member, the second switches being interconnected with the first switches to form a switching matrix;

means responsive to the provision of a path through the switching matrix for moving the switch actuator in a direction opposite to the particular direction at a rate of speed greater than the particular rate of speed to return the switch actuator to the rest position; and means for blanking the pulses during the return of the switch actuator to the rest position.

References Cited by the Examiner

UNITED STATES PATENTS

| | | | |
|---|---|---|---|
| 3,021,392 | 2/1962 | Wrede et al. | 340—365 |
| 3,074,059 | 1/1963 | Flavan | 340—365 |
| 3,078,349 | 2/1963 | Sasaki | 179—90.2 |
| 3,189,692 | 6/1965 | Andregg et al. | 179—90.2 |

References Cited by the Applicant

UNITED STATES PATENTS

| | | |
|---|---|---|
| 2,467,989 | 4/1949 | Porch. |
| 2,813,931 | 11/1957 | De Forest. |
| 3,062,920 | 11/1962 | Schacki. |

KATHLEEN H. CLAFFY, *Primary Examiner.*

J. W. JOHNSON, A. H. GESS, *Assistant Examiners.*